(12) United States Patent
Radhakrishnan et al.

(10) Patent No.: US 12,333,177 B2
(45) Date of Patent: Jun. 17, 2025

(54) IDENTIFICATION AND RETRIEVAL OF RECENTLY-USED FILES AT AN EXTERNAL STORAGE DEVICE

(71) Applicant: Sandisk Technologies, Inc., Milpitas, CA (US)

(72) Inventors: Rohith Radhakrishnan, Bayan Lepas (MY); Alvin Gomez, Sengkang (SG)

(73) Assignee: Sandisk Technologies, Inc., Milpitas, CA (US)

( * ) Notice: Subject to any disclaimer, the term of this patent is extended or adjusted under 35 U.S.C. 154(b) by 37 days.

(21) Appl. No.: 18/361,537

(22) Filed: Jul. 28, 2023

(65) Prior Publication Data
US 2024/0264764 A1 Aug. 8, 2024

Related U.S. Application Data

(60) Provisional application No. 63/443,292, filed on Feb. 3, 2023.

(51) Int. Cl.
*G06F 3/06* (2006.01)
(52) U.S. Cl.
CPC .......... *G06F 3/0653* (2013.01); *G06F 3/0607* (2013.01); *G06F 3/064* (2013.01); *G06F 3/0679* (2013.01)

(58) Field of Classification Search
CPC ...... G06F 3/0653; G06F 3/0607; G06F 3/064; G06F 3/0679
See application file for complete search history.

(56) References Cited

U.S. PATENT DOCUMENTS

| | | | |
|---|---|---|---|
| 9,455,939 B2 | 9/2016 | Meisels et al. | |
| 11,010,300 B2 | 5/2021 | Watkins et al. | |
| 2004/0019736 A1* | 1/2004 | Kim | G06K 19/07732 711/103 |
| 2010/0217938 A1* | 8/2010 | Schneider | G06F 12/0802 711/E12.017 |
| 2021/0209128 A1 | 7/2021 | Muller et al. | |

* cited by examiner

*Primary Examiner* — Jae U Yu
(74) *Attorney, Agent, or Firm* — PATTERSON + SHERIDAN, LLP (57) ABSTRACT

Devices and techniques are disclosed wherein a data storage device (DSD) generates ranking information corresponding to user data stored at a non-volatile memory of the DSD. The ranking information can be used by the DSD to form a frequently used files list, which can be read by a host system upon initialization with the host system and displayed to a user at the host system.

20 Claims, 9 Drawing Sheets

IDENTIFICATION AND RETRIEVAL OF RECENTLY-USED FILES AT AN EXTERNAL STORAGE DEVICE

PRIORITY CLAIM AND CROSS-REFERENCE TO RELATED APPLICATION

This application claims the benefit under 35 U.S.C. § 119(e)(1) of U.S. Provisional Application No. 63/443,292, filed Feb. 3, 2023, which is hereby incorporated by reference in its entirety.

BACKGROUND

As the storage capacity of external storage devices increases, so does the amount of data stored on them. This data can be both structured and un-structured and can be scattered across hundreds of files and folders within a given storage device. Out of a potentially huge volume of data stored on an external storage device, it is possible that most often only a small number of stored files are routinely worked on and accessed frequently.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data management of data storage devices by a remote control interface.

Overview

The storage capacity of external storage devices continues to increase, resulting in an increase to the amount of data or number of files capable of being stored on them. The stored data can be scattered across hundreds of files and folders of a given storage device. While a potentially large volume of data may be stored on an external storage device, it is often likely that a small subset of the stored files are routinely accessed and/or modified. Perhaps a few of the many stored files represent frequently retrieved works-in-progress.

As the external storage device is interfaced with various host systems, and is moved from host to host, a new host system does not have information about the past patterns of data and file use. For example, the new host does not know which files were most recently used and so it cannot indicate to the user which files are relevant based on previous frequent use or access. Consequently, each time the external storage device initializes on a new host, the user must manually traverse multiple folders to find and access a relevant file from its physical location on the device. Currently no existing method provides a frequently-used list of files to a user when an external storage device is initialized on a new host system.

Certain embodiments disclosed herein provide devices and techniques wherein a data storage device (DSD) sends a list of "frequently used files," in a ranked order, to a host system upon initialization with the host system. A DSD refers to a device that stores data, and can include hard disk drives (HDDs), solid state drives (SSDs), tape drives, hybrid drives, and so forth. Some embodiments of DSDs include removable (i.e., portable) data storage devices such as removable flash drives, memory cards, hard disk drives (HDDs), solid state drives (SSDs), hybrid drives, and so forth.

In various embodiments, the DSD creates or modifies a metadata table containing ranked information corresponding to a "frequently used files" list, and sends the metadata table to the host system (or makes the metadata table available to the host system) upon initialization with the host system. The host system includes software giving the host system the capability to read the metadata table and to conveniently display the "frequently used files" list to the user. The software may be native to the host system or it may be installed to the host system or read from the DSD as part of initialization. For example, the software may be native software used by the host system to read metadata, it may be open source software, or the software may be proprietary to the DSD, or the like. When the DSD is interfaced to the host system, the host may auto-read data from the DSD, including any software and metadata table(s) for a "frequently used files" list.

In various examples, the disclosed solution checks for the active state of a file and logs the state in the DSD's internal file system (i.e., memory). In other words, when a file is accessed, the metadata table is updated with the access information, as well as the duration of any modifications made to the file while it is accessed. In another example, the disclosed solution counts the number of times a file is accessed from a physical location on the DSD and logs it in the DSD's file system. In a further example, the disclosed solution creates a list of the most-used memory blocks of the DSD, using a top to bottom ranking (based on the user-access pattern), and writes or updates a metadata table in the DSD's file system. In the example, the physical location may also be mapped to its respective Logical Block Address (LBA), facilitating access to the file. The host system can read the metadata table, for example, during a fresh initialization, to identify and display the most frequently used files.

The creation or update of the metadata table can be part of a disclosed technique to automate the display of a "frequently used files" list (at the host system) to the user. For example, the owner/user can quickly and reliably access recently and frequently used files stored on the DSD, which otherwise would be accomplished using a manual search at the host system when using a removable data storage product. Such a manual file search can be tedious and time-consuming, particularly when the DSD has been in use for some time and has a large number of files stored thereon. Further, many users do not set up well-organized or descriptive folders on a DSD that could aid in such a search.

The solutions presented herein can provide for simplified data and file access compared to certain alternative systems. For example, the use of a "frequently used files" list on a new host system in communication with a DSD provides a simplified interface when compared to legacy techniques (where the user searches through a large number of folders and files for a desired document). Instead, the frequently-used file information is made available to the new host system for display during initialization with the DSD, which can be used to access desired files. Further, there is no need for the end user to have knowledge of data and file management processes to effectively use the capabilities of a sophisticated and convenient file access system.

Data Storage Device File Access System

Figure 1:
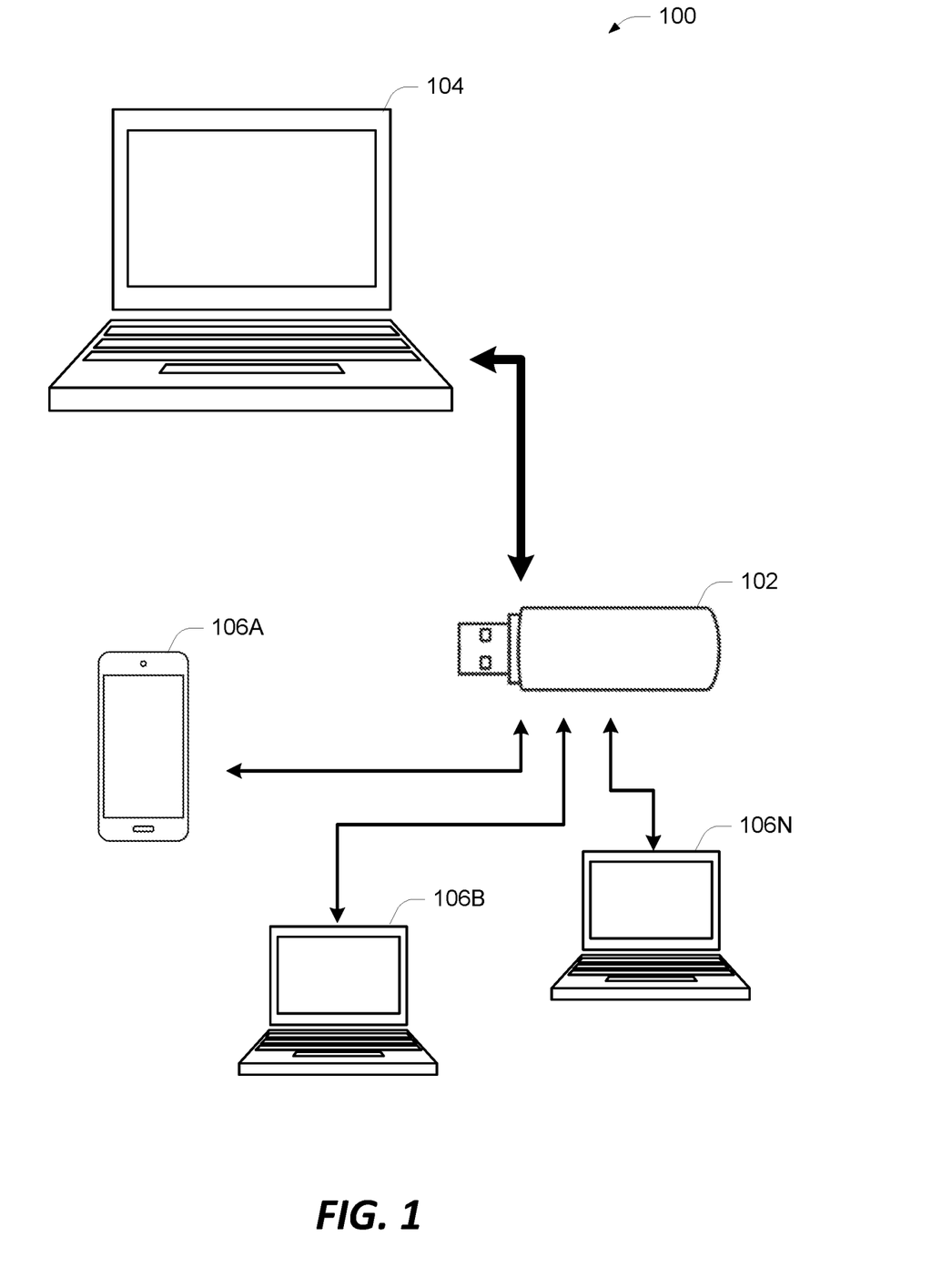
FIG. 1 is a block diagram of a data access system according to one or more embodiments.

FIG. 1 is a block diagram illustrating an example data storage device (DSD) file access system 100 ("system 100") which includes an example data storage device (DSD) 102. As shown in the diagram of FIG. 1, the DSD 102 may comprise a portable or removable data storage device. The DSD 102 can be coupled to a host system ("host") 104 for data storage operations, data access operations, or the like. For example, data storage operations may include copying, transferring, synchronizing, or otherwise exchanging data between the host 104 and the DSD 102. Data access operations may include viewing or modifying data stored on the DSD 102 at the host 104, including files, documents, databases, and so forth. Data storage operations and data access operations may be achieved over any desirable or practical data communication path, such as a wired or wireless pairing between the DSD 102 and the host 104.

The DSD 102 can be operatively coupled to the host 104 using any of various physical and communication coupling techniques and protocols. For instance, the DSD 102 may be coupled to the host 104 using a Universal Serial Bus (USB) type coupling, such as USB type-A, type-B, type-C, type-A micro, type-B micro, a Lightning™ type or Thunderbolt™ type coupling, a Secure Digital (SD) type coupling, a Serial Advanced Technology Attachment (SATA) type coupling, an Integrated Drive Electronics (IDE) type coupling, and so forth. Various corresponding protocol types can be used to transfer data between the DSD 102 and the host 104, including a USB protocol, a Lightning™ or a Thunderbolt™ protocol, a SD protocol, a SATA protocol, an IDE protocol, a Peripheral Component Interconnect express (PCIe) protocol, a Non-volatile Memory express (NVMe) protocol, or the like.

As also shown at FIG. 1, the system 100 can include one or more "prior host" systems (106A-106N). A prior host system 106 may include a communications or computing device, such as a mobile telephone, a personal digital assistant (PDA), or a mobile tablet, a gaming console, a computer, such as a laptop computer, desktop computer, or notebook computer, a network computer, a server, any other electronic device, or any combination thereof, as illustrative, non-limiting examples. A prior host system 106 comprises a device previously interfaced with the DSD 102, and one which has engaged the DSD 102 in data storage operations and/or data access operations, as described above. The prior host device 106 may issue one or more commands to the DSD 102 during the data storage operations and/or data access operations, such as one or more requests to erase data, read data from, or write data to the memory of the DSD 102. For example, the prior host device 106 may be configured to provide data to be stored at the DSD 102, including data retrieved from the DSD 102 and modified at the prior host device 106, or to request data to be read from the DSD 102.

Figure 2:
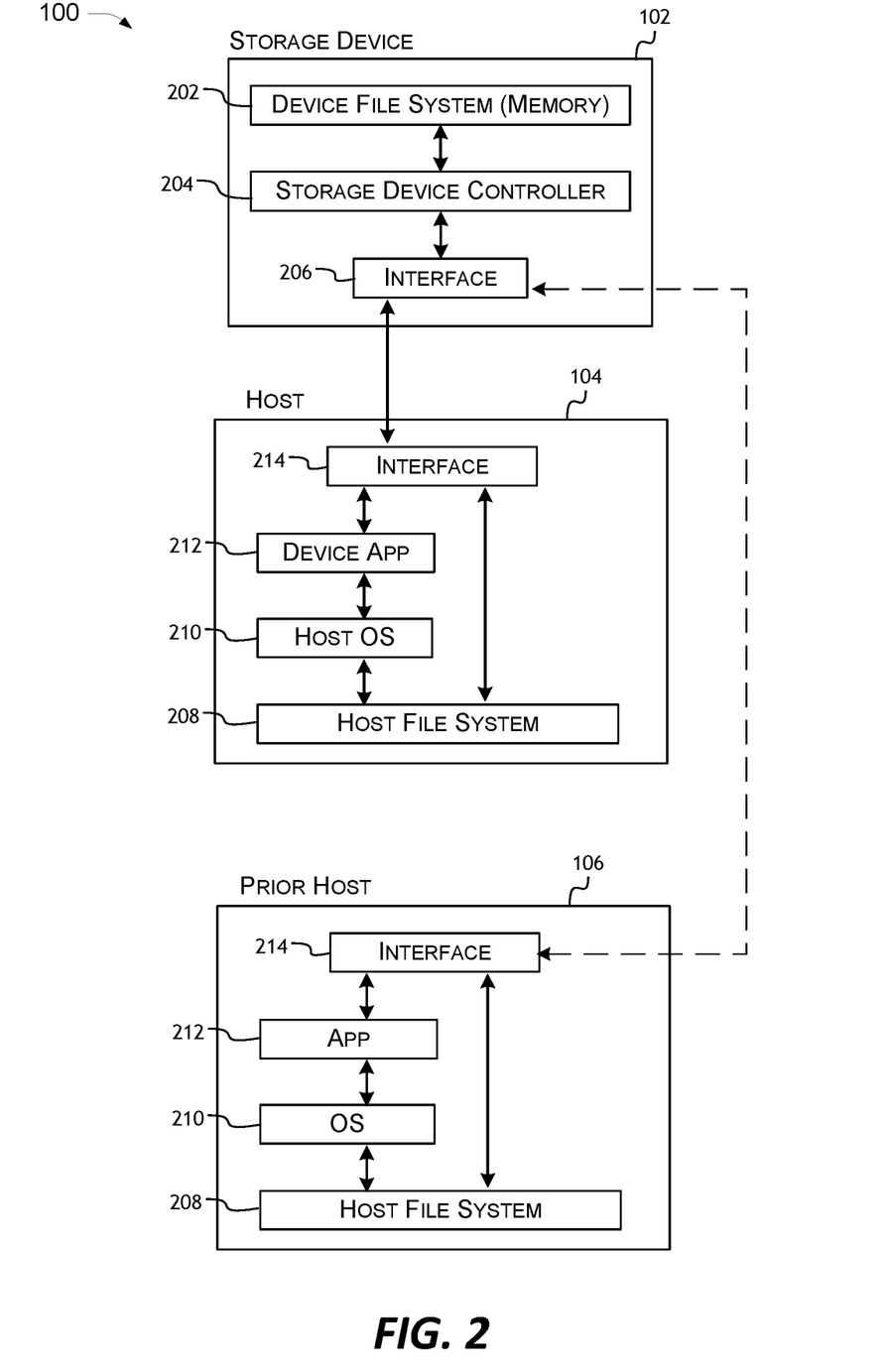
FIG. 2 is a block diagram of a data access system according to one or more embodiments.

Referring to FIG. 2, the DSD 102 includes a device file system (device FS) or non-volatile memory 202, such as a solid state drive, NAND memory, hybrid drive, mechanical drive, or the like. In an example, the device FS 202 is comprised of non-volatile flash memory. The device FS 202 of the DSD 102 is managed and controlled by a storage device controller 204 and is accessed via an interface 206 of the DSD 102. The storage device controller 204 can comprise logic, firmware, and/or other processing components configured to execute instructions received at the DSD 102 (including via the interface 206) and/or stored in the device FS 202. The storage device controller 204 can comprise sufficient controller functionality for implementing data storage operations and data access operations, including data transfer between the DSD 102 and a host 104 (or a prior host 106) directly without direction from a host controller. The interface 206 can include, among other components, wired and wireless communication and other input/output systems and components.

The host 104 includes a host file system (host FS) 208 which provides data storage at the host 104. An operating system (OS) 210 at the host 104 provides management and control of the host FS 208, including allowing access to the host FS 208 by installed applications, processes, or programs. A host device application (host device app) 212 installed at the host 104, which is managed by the OS 210, can provide external access to the host FS 208 via an interface 214. In some examples, the host device app 212 may be configured to access files from the DSD 102, and may be capable of modifying the files and saving the modified files to the memory 202 of the DSD 102. For instance, the host device app 212 may be configured to facilitate data access operations and data storage operations between the device FS 202 of the DSD 102 and the host FS 208 of the host 104.

In various examples, each of the prior host(s) 106 also includes the components discussed with respect to a host 104. For example, each of the prior host(s) 106 includes a file system 208, some form of operating system 210 or management and control instructions, a device app 212 or other application instructions, and an interface 214 capable of data transfer operations between the prior host 106 and the DSD 102. In other words, each prior host 106 includes a memory 208 and the components to engage the DSD 102 in data access operations and data storage operations. In some examples, a prior host device 106 includes a device app 212 capable of making modifications to data retrieved from the DSD 102 and saving the modified data back to the memory 202 of the DSD 102.

Figure 3:
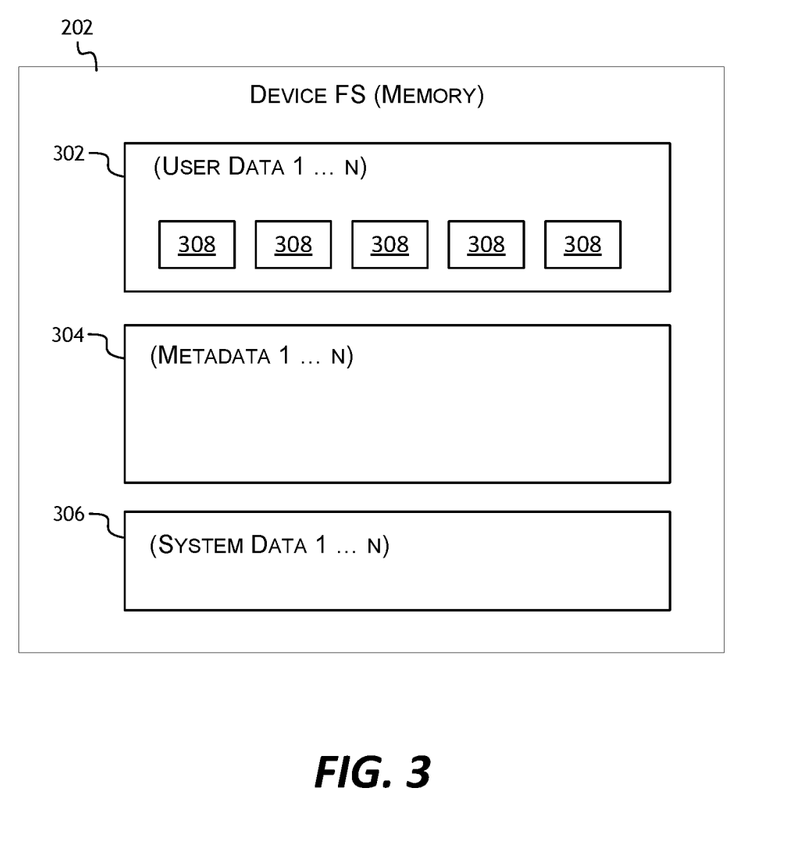
FIG. 3 is a block diagram of a device file system of a storage device, according to one or more embodiments.

Referring to FIG. 3, the device FS or memory 202 of the DSD 102 can include dedicated non-volatile memory storage areas (physical memory blocks). For example, the memory 202 can include memory blocks dedicated for storage of user data 302, metadata 304 (which may be associated to the user data 302), and system data 306. In other examples, the memory 202 may include dedicated storage areas for other types of memory storage. The user data 302 storage area can include dedicated memory blocks 308 for storing data to be accessed, read, modified, erased, and otherwise manipulated by the user. Logical to physical addressing of memory blocks 308 may also be stored in the user data 302, or it can be stored in another dedicated area of memory, such as in the metadata storage 304, for example.

Metadata storage 304 can include metadata associated to the stored user data. For instance, stored metadata can include file access information and file modification information that can be used to generate a frequently used files list, as described further below. File access information can include the number of times a file has been accessed, when the file was accessed, the last time the file was accessed, and so forth. File modification information can include whether a file was modified when it was accessed, how long the file was open if it was modified, and the like. Additional information that can be stored in the metadata 304 memory area includes a ranking of the frequently used files, based on the file access information and the file modification information.

The system data 306 memory area can store system instructions used by the storage device controller 204, for example. Such instructions can include instructions to send or make available the frequently used files list and information to the host system 104 upon initialization with the host 104 (or at another convenient time or when instructed to by the host 104). Instructions to collect the file access information and file modification information can also be stored in the system data 306. Additionally, instructions to calculate the rankings based on the file access information and file modification information and to organize (and update) the frequently used files list can also be included.

Figure 4:
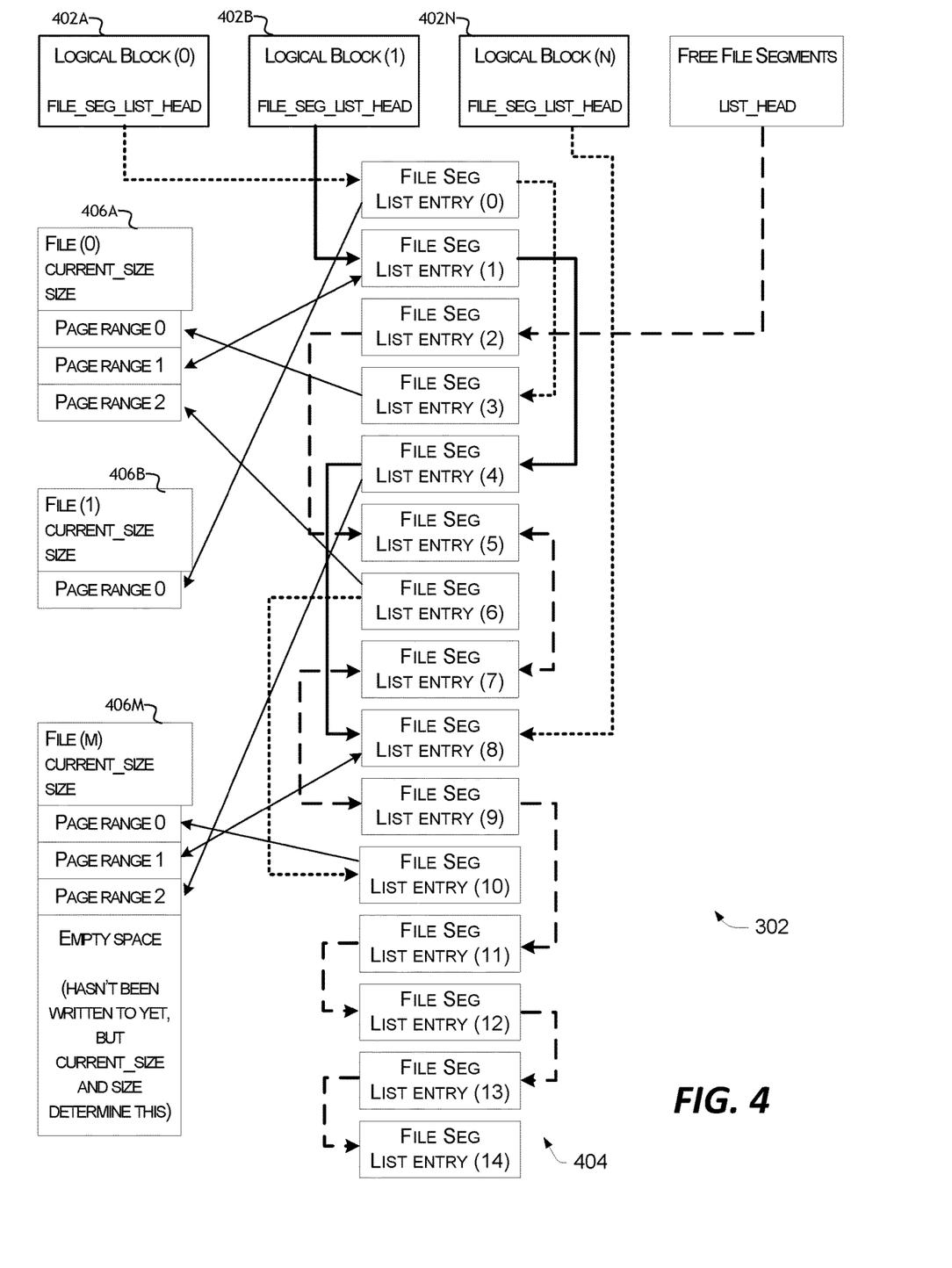
FIGS. 4 and 5 are block diagrams of an example memory organization arrangement, according to one or more embodiments.
Figure 5:
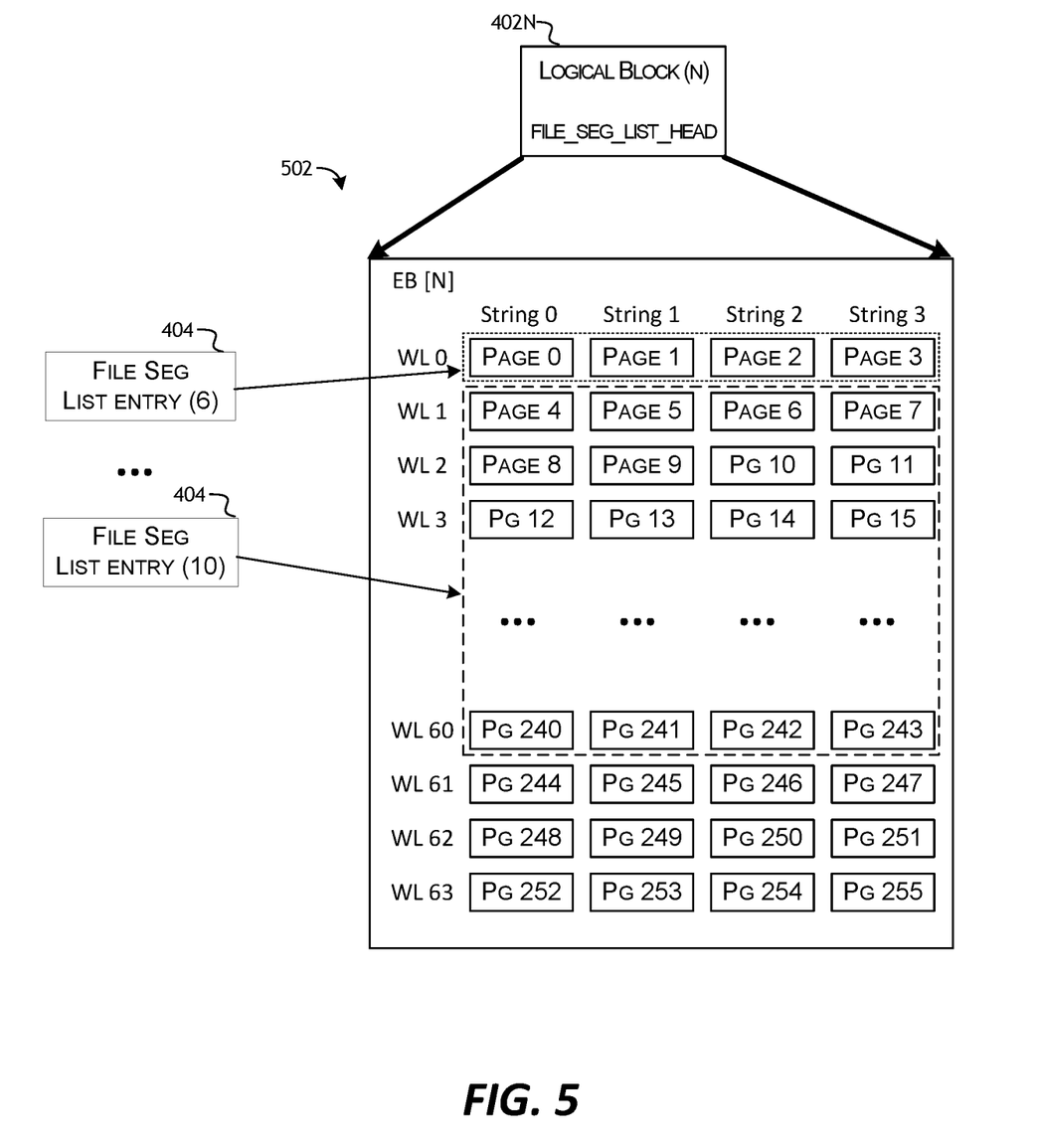

Referring to FIGS. 4 and 5, examples of data storage organization within the user data 302 are shown. For instance, data can be stored in physical memory blocks 308, with physical memory addresses which are mapped to Logical Block Addresses (LBAs) 402. Associated Logical to Physical (L2P) pages 502 are a correlation of logical addresses assigned to the blocks 308 of user data to the physical addresses of memory locations of the DSD FS 202 in its current state. For example, segments of files may be stored in non-sequential physical blocks 308 of the memory 302. Logical addresses assigned to the physical blocks 308 allow the DSD 102 to find the scattered data in the non-sequential physical locations.

In an example, the storage device controller 204 of the DSD 102 monitors the activity state of the storage blocks 308, rather than the stored files 406, which are comprised of a number of storage blocks 308 in the memory 302. For instance, the controller 204 monitors the access and the modification of the storage blocks 308. As part of the process, the controller 204 logs the access and modification of the storage blocks 308 in the metadata 304, which is seen by the host 104 as the access and modification of stored files. The physical locations of the blocks 308 are mapped to the respective logical block addresses, which represent the stored files.

Example Workflows and Use Cases

Figure 9:
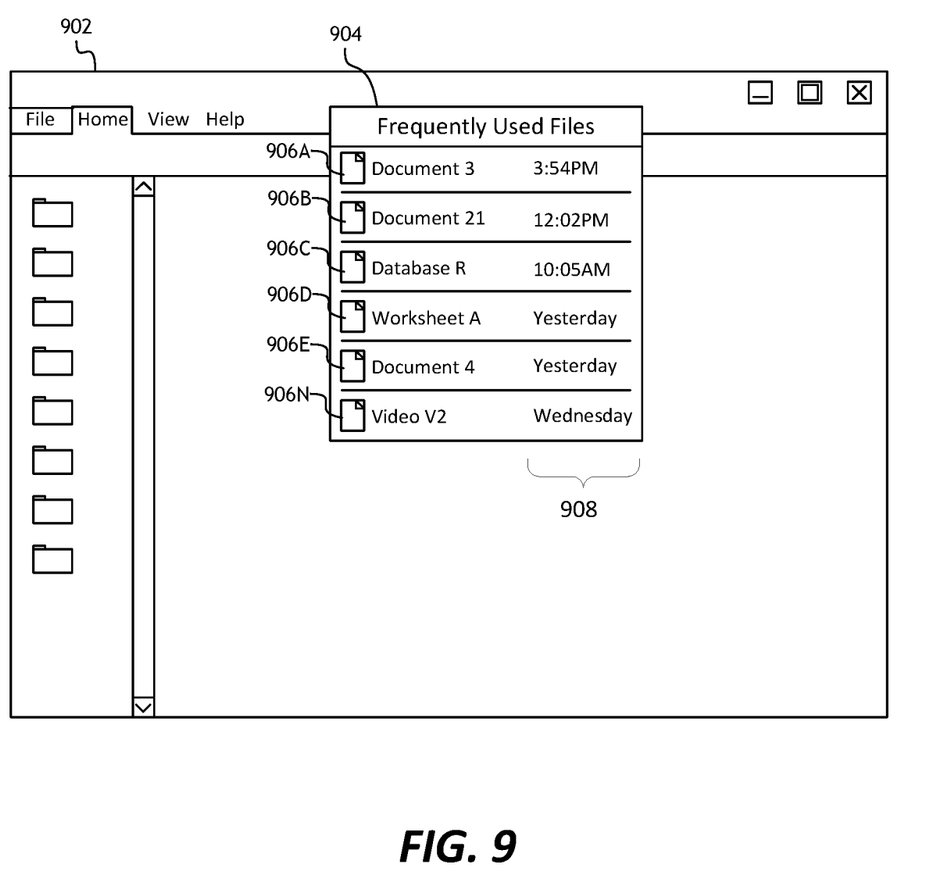
FIG. 9 is a block diagram of an example user interface according to one or more embodiments.

In various examples, responsive to initializing with a host system 104 or receiving a request (e.g., control instructions) from the owner/user via the host system 104, or a similar request, the DSD 102 is triggered to make available to the host 104 or to send to the host a list 904 of frequently used files 906, which the host 104 can display to the user (see FIG. 9, for example). The host 104 can display the list 904 to the user in the form of a user interface (UI) 902, such as a graphical user interface (GUI) or the like. In an example, the user can select one of the frequently used files 906 listed at the UI 902 to navigate to the file 906 on the DSD 102. In other words, the user can access the file 906 at the host 104 to read the file 906, modify the file 906, save the file 906 at the host 104 or save the file 906 back to the DSD 102, and so forth.

In an example, prior to the DSD 102 interfacing with the host 104, the DSD 102 may have interfaced with one or more prior hosts 106. The prior host(s) 106 may have engaged the DSD 102 in data storage operations and/or data access operations, as described above. For instance, the user may have accessed one or more files 906 on the DSD 102 while the DSD 102 was interfaced to a prior host 106 (or a plurality of prior hosts 106). The user may have accessed some of the same files 906 a number of times while the DSD 102 was interfaced with a prior host 106 or hosts 106, and may have modified (e.g., edited) one or more of the accessed files 906 during the interface(s) with the prior host(s) 106. The unmodified and modified files 906 that were accessed are saved back to the DSD 102.

Figure 6:
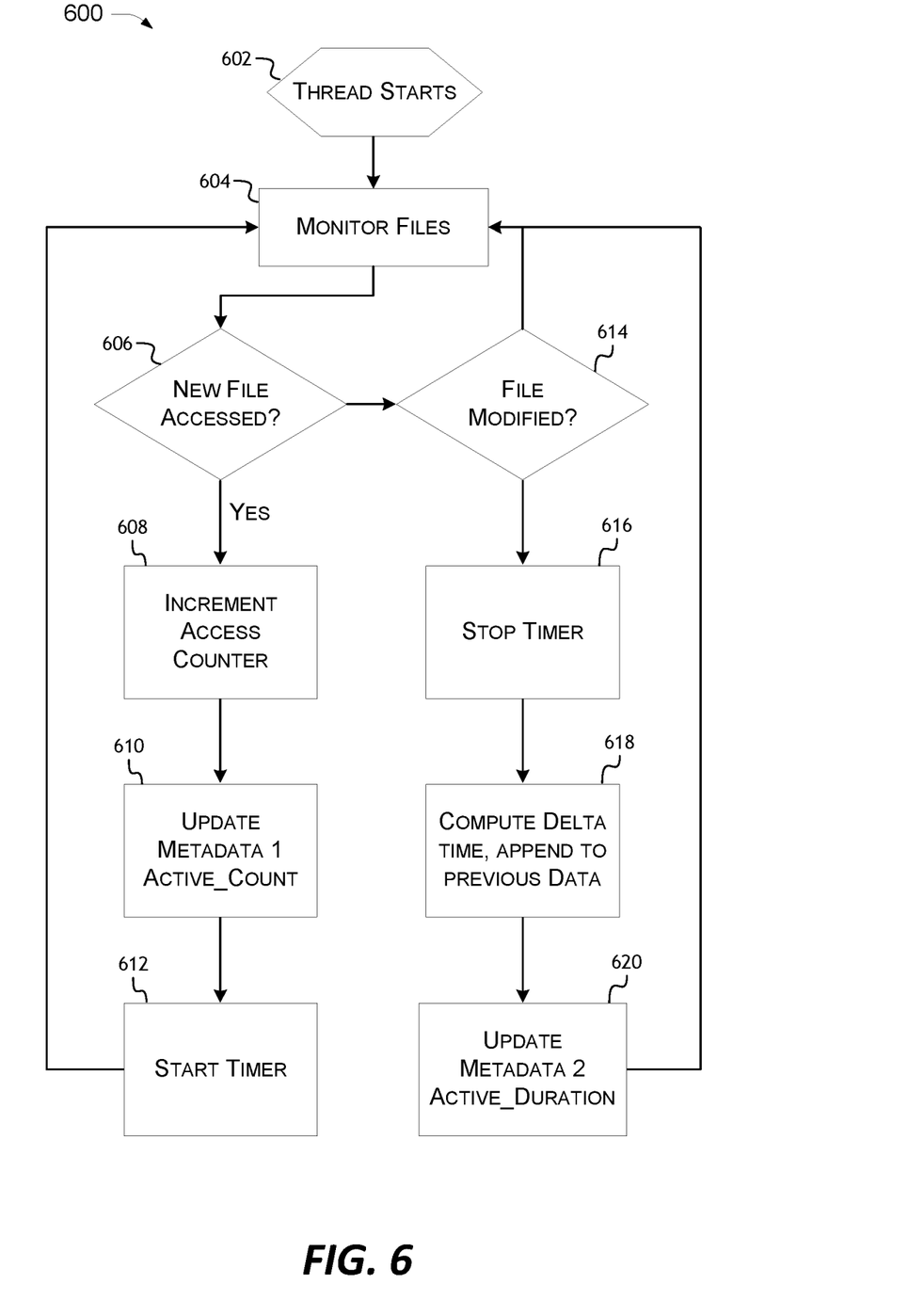
FIG. 6 is a flow diagram of an example data access workflow according to one or more embodiments.

Referring to FIG. 6, a flowchart shows an example workflow 600 for updating the metadata used to generate the list 904 of frequently used files 906. The discussion of the example workflow 600 refers to the block diagrams of the example file access system 100 shown at FIGS. 1 and 2 and the block diagrams of the example DSD 102 file system 202 shown at FIGS. 3-5. At block 602 of FIG. 6, the DSD 102 is triggered to generate metadata for a list 904 of frequently used files 906 stored on the DSD 102. The trigger can be in response to a file 906 being accessed on the DSD 102 while the DSD 102 is interfaced to a prior host 106. Further, the trigger can be in response to other activity, such as the DSD 102 initializing to a new host 104. In other examples, the DSD 102 can be triggered to generate the metadata for the frequently used file list 904 upon a request or command from a prior host 106, from the host 104, or from the user, which may also come through a prior host 106 or a host 104.

At block 604, the controller 204 of the DSD 102 checks the active state of the files stored on the DSD 102. The controller 204 monitors the files stored in the memory 302 by checking the data blocks 308 for access. For example, at block 606 the controller 204 checks to see if a data block 308 has been newly accessed. At block 608, in the case where the data block 308 is being newly accessed, a count of total times the data block 308 has been accessed from a physical location is incremented by one. The controller 204 keeps a tally on the number of times a data block 308 in storage 302 is accessed over its lifetime. The count or tally is cumulative, with respect to the host 104 and to all of the prior hosts 106 that have engaged with the DSD 102.

Figure 7:
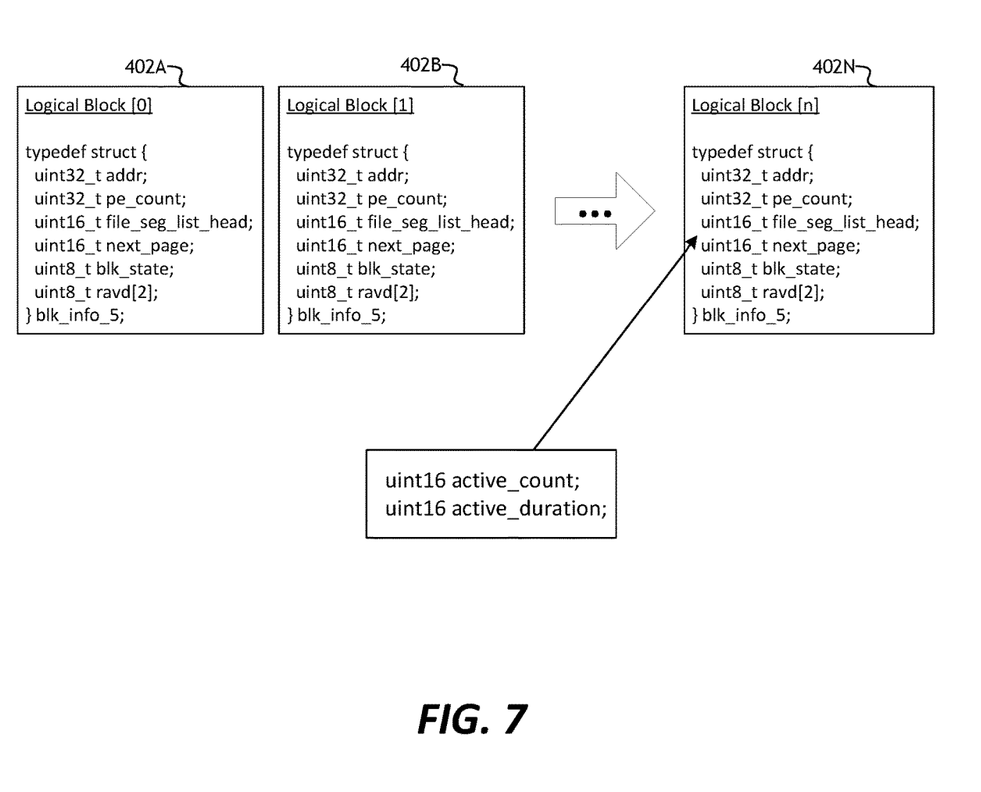
FIG. 7 is a block diagram of a portion of a data storage system according to one or more embodiments.

At block 610, the total access count for the data block 308 is updated in metadata 304 associated with the data block 308. In an example, each data block 308 stored in memory 302 has a corresponding logical block 402 that can be stored in metadata storage 304. As shown at FIG. 7, at block 610, a first additional metadata entry is added or updated to the logical block 402 that has the file segment list head that corresponds to the accessed data block 308. The first additional entry ("Metadata 1") keeps a record of the number of times the file segment (e.g., the data block 308) has been accessed from the DSD 102. In an example, the metadata entry may be referred to as "active_count". The "active_count" entry is added to other metadata corresponding to the file segment or data block 308. Additionally, the time of access can be read from a system clock (e.g., from the prior host 106, the host 104, etc.) and can be stored in the metadata corresponding to the file segment or data block 308.

At block 612, the controller 204 starts a timer that tracks the amount of time the file segment (e.g., the data block 308) is "open" for a write or a modify operation on the file segment. At block 614 the controller 204 checks to see if the data block 308 is modified. If the data block 308 is not modified, then the timer is stopped at block 616, and the timer duration is disregarded. If the data block 308 is modified, the timer is stopped at block 616 when the modifications are ceased (e.g., when the file 906 is closed). At block 618, the controller 204 calculates the delta time, or the duration that the data block 308 was being modified (based on the timer start and stop times), and appends that duration to any previous modify duration time associated to the data block 308. In other words, the modify time can be cumulative over the life of the data block 308. In an example, as shown at FIG. 7, at block 620, a second additional metadata entry is added or updated to the logical block 402 that has the file segment list head that corresponds to the accessed data block 308. The second additional entry ("Metadata 2") keeps a record of how long the file segment (e.g., the data block 308) was open for modification during a write/modify operation. In an example, the metadata entry may be referred to as "active_duration". The "active_duration" entry is added to other metadata corresponding to the file segment or data block 308.

The process 600 continues back at block 604 where the controller 204 continues to monitor the files stored in the memory 302 by checking the data blocks 308 for new access. Files or data blocks 308 that are currently being accessed are not considered for a new access, but are monitored for any modifications to the files.

Figure 8:
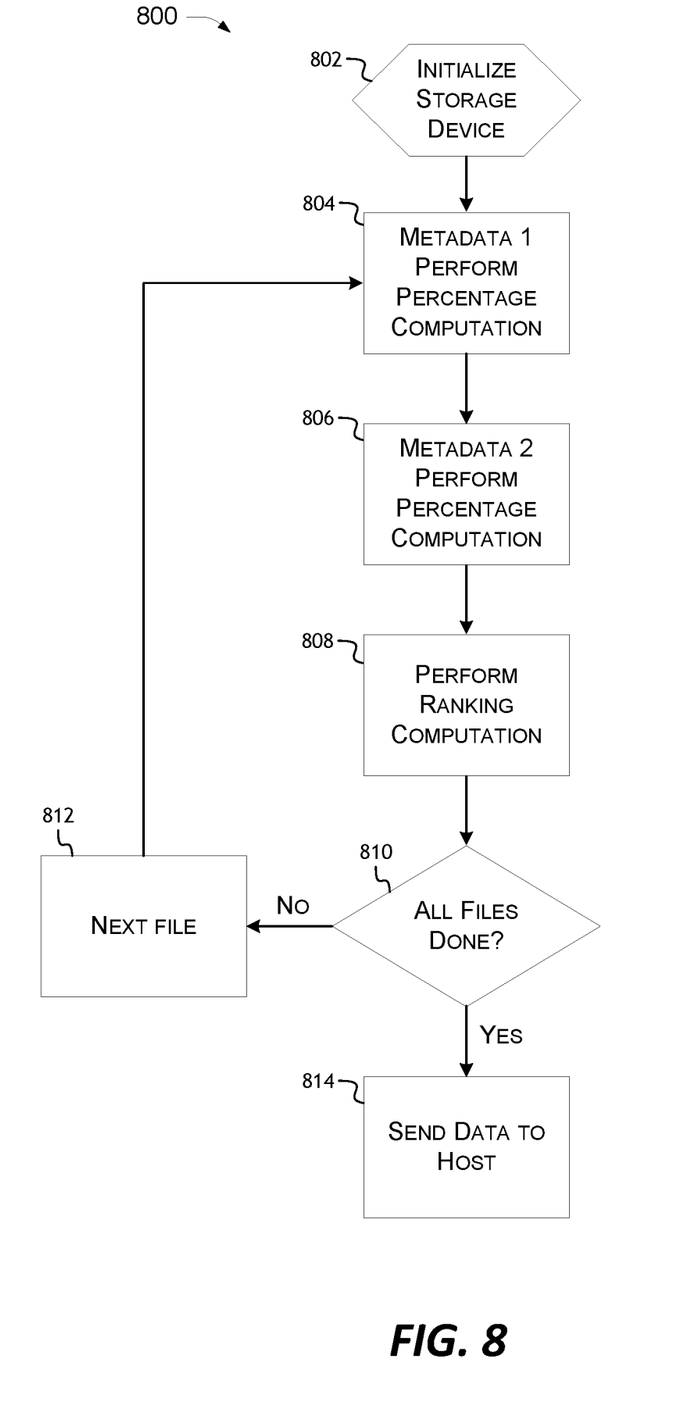
FIG. 8 is a flow diagram of an example data access workflow according to one or more embodiments.

Referring to FIG. 8, a flowchart shows an example workflow 800 for ranking the files 906 for display in the list 904 of frequently used files. In the workflow 800, the controller 204 creates a list of most used data blocks 308 from top to bottom ranking (based on user access pattern) and updates it to a metadata table in memory 202, where the physical location of the data blocks 308 is also mapped to its respective LBA 402, indicating the associated file 906. The discussion of the example workflow 800 refers to the block diagrams of the example file access system 100 shown at FIGS. 1 and 2 and the block diagrams of the example DSD 102 file system 202 shown at FIGS. 3-5, as well as the workflow 600 discussed with reference to FIG. 6.

At block 802 of FIG. 8, the DSD 102 is initialized to the new host 104. The initialization triggers the controller 204 to perform the ranking computations. Alternately, the controller 204 can be triggered to perform the ranking computations by other events, including commands to the controller 204 via the host 104, and so forth.

As part of the process, the controller 204 ranks each of the data blocks 308 (corresponding to files 906A-906N) stored in the memory 302 that have "active_count" or "active_duration" metadata, in an order of relevance for presentation on the list 904 of frequently used files. For instance, files 906 with greater relevance (e.g., a higher ranking) are listed above files 906 with lesser relevance. Files 906 with low relevance (e.g., a lower ranking) may not be listed. In an example, files 906 that have been recently accessed or recently modified can have priority (e.g., a potentially higher ranking) over files 906 that have not been recently accessed or recently modified. In another example, files 906 that have been accessed a greater number of times can have priority over files 906 that have been accessed a fewer number of times. In another example, files 906 that have been open for modification for a longer duration can have priority over files 906 that have not been open for modification or that have been open for modification for a shorter duration.

At block 804, the controller 204 performs a percentage computation on "Metadata 1", which comprises the "active_count" metadata. Data blocks 308 with "active_count" metadata are considered in the computation. The "active_count" percentage computation is performed by comparing the "active_count" value of each data block 308 to the summed total of the "active_count" values of all data blocks 308. The files 906 having the data blocks 308 with the highest percentages are considered for the frequently used files list 904.

Depending on the desired number of files 906 for the frequently used files list 904, the files 906 to be considered for the list 904 can be determined by establishing a minimum percentage value, which can be stored in memory 202. In an example, the minimum percentage value may be 10%. In the example, files 906 with data blocks 308 having an "active_count" percentage of 10% or greater are considered for the frequently used files list 904. Alternately, the minimum percentage value may be greater or less than 10%. In another example, the files 906 with data blocks 308 having the top 5 "active_count" percentage values (or another quantity as desired) are considered for the frequently used files list 904 (optionally subject to some minimum "active_count" percentage value, for example).

At block 806, the controller 204 performs a percentage computation on "Metadata 2", which comprises the "active_duration" metadata. Data blocks 308 with "active_duration" metadata are considered in the computation. The "active_duration" percentage computation is performed by comparing the "active_duration" value of each data block 308 to the summed total of the "active_duration" values of all data blocks 308. The files 906 having the data blocks 308 with the highest percentages are considered for the frequently used files list 904.

Depending on the desired number of files 906 for the frequently used files list 904, the files 906 to be considered for the list 904 can be determined by establishing a minimum percentage value, which can be stored in memory 202. In an example, the minimum percentage value may be 15%. In the example, files 906 with data blocks 308 having an "active_duration" percentage of 15% or greater are considered for the frequently used files list 904. Alternately, the minimum percentage value may be greater or less than 15%. In another example, the files 906 with data blocks 308 having the top 5 "active_duration" percentage values (or another quantity as desired) are considered for the frequently used files list 904 (optionally subject to some minimum "active_duration" percentage value, for example).

At block 808 the controller 204 performs the ranking computation for each data block 308 (corresponding to a file 906) considered for the frequently used files list 904. The computed ranking can be stored (and updated) in metadata associated with the respective data block 308 (or file 906). In an example, the controller 204 aggregates the percentage computations for the "active_count" metadata and the "active_duration" metadata for the data block 308. In some examples, the ranking computation can be weighted by adjusting the minimum percentage values for the "active_count" metadata and the "active_duration" metadata computations. In that way, greater weight can be applied to files 906 that have been accessed more often or to files 906 that have been open for modification longer, as desired. An aggregated ranking is computed for each data block 308

(e.g., for each file 906) to be compared with the rankings of the other data blocks 308 (e.g., the other files 906 being considered for the list 904). The aggregated ranking can include adding the percentages from the "active_count" and the "active_duration" computations, for example. The aggregated ranking can include additional computations using the percentages from the "active_count" and the "active_duration" computations as well. Additional weight (e.g., using a multiplier, etc.) can also be given to files 906 that have most recently been accessed over files 906 that have not been accessed recently (e.g., within the last couple of hours, the last day, the last week, etc.) as desired.

At blocks 810 and 812, the controller 204 continues to perform the ranking computation for each data block 308 (corresponding to a file 906) considered for the frequently used files list 904, until each of the considered data blocks 308 (e.g., files 906) has been completed. The data blocks 308 or associated files 906 can be assembled in ranked order during the ranking computations. At block 814, the controller 204 sends the frequently used files list 904 to the host 104, with the files 906 in a ranked order, based on the computations described above. The list 904 may be sent to the host 104 as metadata, which can be displayed by the host 104 as a list 904. For instance, the host 104 will have the capability (e.g., software, etc.) to read the metadata from the DSD 102. IN an example, the DSD 102 sends the metadata to the host 104 (or makes the metadata available to the host 104) when initializing with the host 104. Referring to FIG. 9, the list 904 may be displayed by the host 104 in the form of a UI 902 or a GUI as desired. Additional information 908 may be displayed with the list 904 and/or with the files 906, such as the time and/or date of last access, and the like.

The frequently used files list 904 is presented to the user at the host 104. The list 904 provides a quick way for the user to know the most used files stored on the DSD 102. For instance, the user does not have to remember the location of a file 906 that was previously being worked on (for example on a prior host 106). This can save the user considerable time that would otherwise be used to manually locate a file on the DSD 102. Rather than undertaking a manual search of the DSD 102 for a file 906, the user can simply look at the frequently used files list 904. In some examples, the user can select the desired file 906 from the list 904 to be linked to the location of the file 906 on the DSD 102. In some cases, the file access system 100, including the generation of a frequently used files list 904 as described herein, can be bundled with on-board software or firmware stored at the DSD 102 (in the system data 306, for example).

Additional Embodiments

Those skilled in the art will appreciate that in some embodiments, other types of data transfer methods and systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A system for file access management, comprising:
a data storage device including:
an interface for operatively coupling with a host device;
a non-volatile memory for storing user data; and
a controller configured to generate ranking information corresponding to the user data stored at the non-volatile memory, wherein the ranking information includes a count of how many times a data block has been accessed from the data storage device and a duration of how long the data block was open during modification of the data block.

2. The system of claim 1, wherein the interface is configured for an exchange of data between the data storage device and the host device.

3. The system of claim 1, wherein the controller provides the ranking information to the host device in response to initialization of the data storage device to the host device.

4. The system of claim 1, wherein the controller is configured to add or update at least one metadata entry associated to a file stored as user data when the file is accessed by a device external to the data storage device.

5. The system of claim 1, wherein the controller is configured to generate a metadata table using the ranking information, comprising a list of frequently used user data files.

6. The system of claim 1, wherein the controller is configured to calculate a percentage comparing the count of how many times a data block has been accessed from the data storage device to a summed total of a number of times all data blocks of the user data have been accessed from the data storage device.

7. The system of claim 1, wherein the controller is configured to calculate a percentage comparing the duration of how long the data block was open during modification to a summed total of durations of how long all data blocks of the user data were open during modifications.

8. The system of claim 1, wherein the data storage device comprises a portable external drive.

9. A portable data storage device, comprising:
a means for operatively coupling with a host;
a non-volatile memory for storing user data; and a controller configured to:
- generate ranking information corresponding to the user data stored at the non-volatile memory;
- monitor an amount of time that a data block of the user data is open during modification of the data block; and
- update a metadata record associated with the data block with the amount of time.

10. The portable data storage device of claim 9, wherein the controller is configured to monitor the user data for access, and to update a metadata record with a number of times that a data block of the user data is accessed.

11. The portable data storage device of claim 9, wherein controller is configured to append the amount of time to any previous time duration associated with modification of the data block.

12. A portable data storage device, comprising:
a means for operatively coupling with a host;
a non-volatile memory for storing user data; and
a controller configured to:
- generate ranking information corresponding to the user data stored at the non-volatile memory; and
- rank a plurality of data blocks of the user data by a number of times each data block has been previously accessed and an amount of time each data block has been open for modification by a device external to the portable data storage device.

13. A method on a data storage device, comprising:
monitoring, at a controller of the data storage device, data blocks stored as user data at the data storage device for access by a device external to the data storage device;
responsive to the monitoring, recording in a memory of the data storage device, a number of times that a data block has been accessed by a device external to the data storage device;
monitoring, at the controller of the data storage device, the data blocks stored as user data at the data storage device for modification by a device external to the data storage device;
recording in the memory of the data storage device, a time duration that a data block is open for modification by a device external to the data storage device;
ranking, at the controller of the data storage device, the data blocks stored as user data at the data storage device based on the number of times that each data block has been accessed by a device external to the data storage device and the time duration that each data block is open for modification by a device external to the data storage device; and
providing, at an interface of the data storage device, a frequently used file list for display at a host device, based on the ranking.

14. The method on a data storage device of claim 13, further comprising generating a metadata table containing the frequently used file list.

15. The method on a data storage device of claim 13, further comprising providing a link to a physical location on the data storage device of each file listed on the frequently used file list with the frequently used file list.

16. The method on a data storage device of claim 13, further comprising automatically providing the frequently used file list in response to the data storage device being communicatively coupled to the host device and initializing to the host device.

17. The method on a data storage device of claim 13, further comprising writing, by the controller, to metadata associated to respective data blocks stored as user data at the data storage device, one or more additional metadata entries with ranking information of the respective data blocks.

18. The method on a data storage device of claim 13, wherein the data storage device comprises a removable portable flash drive.

19. The portable data storage device of claim 12, wherein the controller is configured to generate a metadata table using the ranking information, comprising a list of frequently used user data files.

20. The portable data storage device of claim 12, wherein the controller is configured to provide at an interface of the portable data storage device the list of frequently used user data files at the host.

* * * * *